United States Patent

Pohl

[11] Patent Number: 5,083,693
[45] Date of Patent: Jan. 28, 1992

[54] APPARATUS FOR THE CONTROL OF INSTALLATION FOR TREATMENT OF STAND-FORM PRODUCTS PRODUCED IN AN EXTRUDER OR CALENDER

[75] Inventor: Hans-Jaochim Pohl, Hanover, Fed. Rep. of Germany

[73] Assignee: Paul Troester Maschinenfabrik, Hanover, Fed. Rep. of Germany

[21] Appl. No.: 521,754

[22] Filed: May 10, 1990

[30] Foreign Application Priority Data

May 10, 1989 [DE] Fed. Rep. of Germany ....... 3915279

[51] Int. Cl.⁵ ...................... B29C 47/92; B65H 23/18
[52] U.S. Cl. .................................. 226/44; 226/195; 425/135; 425/171
[58] Field of Search .................. 226/44, 195; 242/75, 242/75.5, 147 R; 425/140, 135, 171

[56] References Cited

U.S. PATENT DOCUMENTS

| | | | |
|---|---|---|---|
| 3,206,961 | 9/1965 | Bailey | 226/44 |
| 3,807,613 | 4/1974 | Holm | 226/44 |
| 4,359,178 | 11/1982 | Hayashi et al. | 226/44 |
| 4,609,336 | 9/1986 | Stevenson et al. | 425/135 |
| 4,775,086 | 10/1988 | Kataoka | 226/44 |

Primary Examiner—Jay H. Woo
Assistant Examiner—James P. Mackey
Attorney, Agent, or Firm—Robert E. Burns; Emmanuel J. Lobato

[57] ABSTRACT

The invention relates to apparatus for controlling equipment for treating rubber and or plastic strand-form products produced by an extruder and/or calender, such equipment having at least one conveyor. The apparatus has a feeler roll carried by at least one arm on a rotatable shaft and engageable with the strand-form product at the end of a conveyor or between two conveyors of the treating equipment. On one end of the shaft there is a cam disc the position of which is sensed by an inductive pick-up to produce a signal indicative of the angular position of the shaft. The shaft is rotatable to vary the position of the feeler roll, by a pneumatic servo motor actuating a rack meshing with a gear wheel fixed on the shaft. The servo motor is controlled by a control circuit which receives the position indicating signal. For positioning the feeler roll in a position for threading the equipment in starting-up, there is provided an override having a second pneumatic servo motor which actuates an arm which is rotatable on the shaft and is engageable with a bolt projecting from the gear wheel.

16 Claims, 3 Drawing Sheets

APPARATUS FOR THE CONTROL OF INSTALLATION FOR TREATMENT OF STRAND-FORM PRODUCTS PRODUCED IN AN EXTRUDER OR CALENDER

FIELD OF INVENTION

The invention relates to apparatus for controlling the speed of an installation for treatment of rubber and/or plastic strand-form products, which runs at different transport speeds, comprising, at one end of a transport line or between two transport lines, a weight-insensitive feeler comprising a feeler roll engaging the strand-form product and mounted on arms on a rotatable shaft provided with an angular position indicator providing an input signal for circuitry controlling the drive of the transport line.

BACKGROUND OF THE INVENTION

Strand-form products produced in extruders and/or calenders are led, after their forming, over a transport line on which they are subjected to further treatment. This further treatment can be simply a cooling process but it can also be a vulcanization or polymerization process, drying process and others. During this treatment, the strand-form products experience changes in length, usually shrinkage, which result from the treatment. These length changes depend on many parameters and are, with respect to control technique, extraordinarily difficult to understand. The transport lines following the extruder and/or calender are hence, with respect to their transport speed, controlled according to product excess or deficiency.

For the fine control of the process technique subject to very small speed differences between the individual transport lines, serve sensors, for example, light barriers, light bands, proximity switches and the like as well as, for a long time, also with displaceable feelers, which comprise a shaft with at least one arm for a feeler roll. As these feelers provided with a displacable feeler roll continually move back and forth according to length excess or deficiencies they are called "dancers".

These feelers, called dancers, can be supported for very easy motion. They must, certainly, on the ground of apparatus sturdiness and on account of the required operational safety corresponding to the manner of the continually running strands, have a certain strength and, above all, also rigidity, which makes the mass of the dancers much larger than would be desired on technical control grounds. The theoretical ideal is, in most cases, an almost massless feeler. It has, therefore, often been sought to ascertain the weight of the feeler roll and its swivel arm so that only minimal forces, which are usually also adjustable, are exerted on the feeler roll. This results in achieving only a very slight loading on the strand that has been produced and is being treated and in avoiding an impairment of the shrinking or indeed a stretching of the produced strand.

Basically, the optimal dancer adjustment must be somewhat "central" i.e. be able to control a variation in speed which is either an increase or a decrease. Practically this dancer adjustment must be in a fully regulated condition and relinquish each feeler impulse only when it has declined. A problem exists therein, that the optimal adjustment speed changes and only after some operating time, swings into the theoretical value of the base speed, namely after reaching full operation.

The starting-up of an installation for production of strand-form products is usually not at full operating speed, but first with a lower speed which is desirable for the installation and, in most cases, is also necessary in order for the initial parts of the extruded strand to be threaded up in proper manner, whether the transition from one installation part to the next according to the installation layout and according to the profile of the produced strand, is effected by hand or takes place automatically. In this threading-up procedure, the dancer embrace of the strand and the beginning of the effectiveness of operative control through the dancer is a problem. A dependent dancer or one that is deviated through a counter balance weight in the opposite position gives a wholly false signal for the following drive, whereby the speed adjustment of the following drive is displaced and the start-up is made difficult. The initial part of the strand produced prior to the corrected control has undesired stretching or shortening and is thus unusuable and must be discarded. Also with this usual dancer arrangement and operation, an automatic transition of the profile start-up from one section to the next is made almost impossible. There is a further problem in that the sensing roll of the dancer carried on a pivoted lever exerts a different load on the continuous profile according to the angle of the lever, so that it acts on the profile through stretching or shortening differently according to its position. An adjustment of the counter balance weights on the feeler during operation is practically prohibited. For the produced strand profile has a very different cross section and shrinkage value according to its kind and size. Accordingly, different load values of the sensing roll on the dancer must be applied which is very difficult and time consuming and therefore in practice remains mostly unused. Also the arrangement of the dancer relative to the respective installation parts, whether the arrangement is horizontally extending or has an upward or downward bending over the head, requires accordingly other working point adjustment, with which the operator operating this installation is charged.

Beyond that, the neutral work point which on such a feeler must be adjusted in combination with its potentiometer can be optimized only for a particular extrusion material and for definite working conditions. An alteration of this once found optimal adjustment for other profile cross sections, velocities and shrinkage values postulates technical control knowledge which normally service personnel operating the installation cannot be expected to have.

SUMMARY OF THE INVENTION

The invention avoids the disadvantages of the state of the art. It is the object of the invention to provide a simple possibility of providing, in the most diverse operating conditions of the installation, a programmed controllable feeler position and loading corresponding to the profile strand produced and the working conditions.

The invention solves this problem through an arrangement for the production of an adjustable position and weight independent load which works on the feeler and which, on the basis of a predetermined program, is adjustable according to the profile strand to be produced and the processing conditions.

It is advantageous when the arrangement for producing a load on the feeler is a rotary device which is connected with the feeler-carrying shaft on which the feeler is secured. This rotary device positions the feeler in accordance with a program, but also independently of its present position corresponding to the present conditions.

Moreover, it is advantageous when the device for producing a load acting on the feeler is a servo motor, preferably in the form of a pneumatic inflatable bellows or a pneumatically driven piston-cylinder unit. Such an arrangement makes it possible to exert very precise controllable forces.

Structurally this device is very simple, when a drive, advantageously in the form of a rack meshing with a gear mounted on the shaft, is arranged between the feeler and the servo motor.

In order to avoid false control of the feeler during the start-up of the installation, it is advantageous when a second servo motor, advantageously in the form of a further pneumatic inflatable bellows or a pneumatically driven piston-cylinder-unit is arranged to be coupled with the feeler in a waiting position. This second servo motor then positions the feeler, during the start-up of the operation, in a position which is advantageous for the threading of the initial portion of the strand produced and is not disadvantageously influenced in the control.

Advantageously the coupling member is a bar fastened on the shaft or a bolt fastened on the gear.

It is advantageous, when there is provided in the control device, a control circuit which produces a program controlled command for the drive of the device for producing a position and weight independent load on the feeler.

It is advantageous when the input circuit of this control circuit is connected with the position indicator of the feeler.

BRIEF DESCRIPTION OF THE DRAWINGS

The essence of the invention is more fully explained with reference to exemplary embodiments shown schematically in the accompanying drawing in which.

DESCRIPTION OF PREFERRED EMBODIMENT

Figure 1:
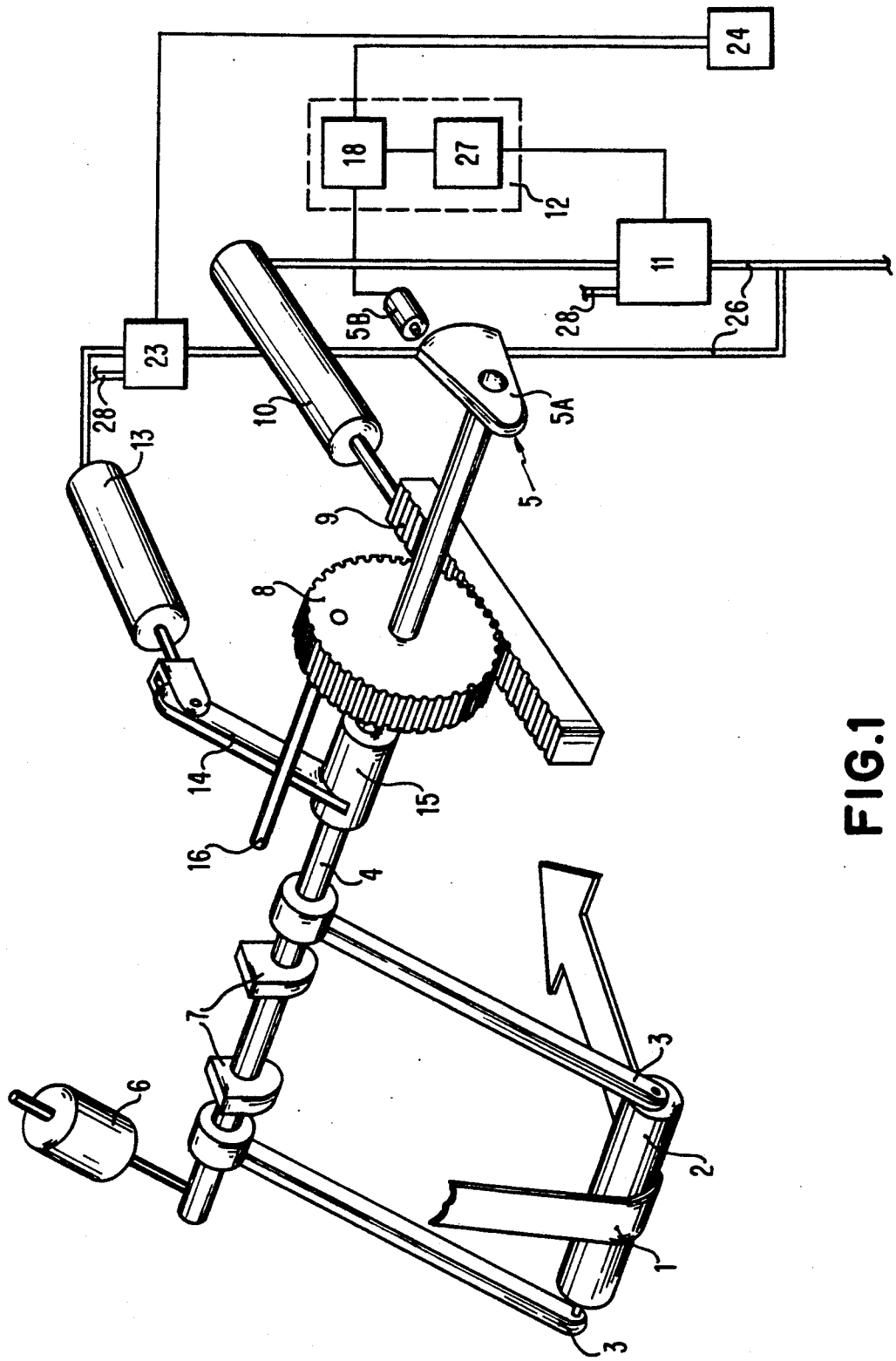
FIG. 1 is a schematic illustration of apparatus in accordance with the invention.

At the end of a conveyor (not shown), a material strand 1 extending from this conveyor to another conveyor (likewise not shown), is engaged by a feeler comprising a feeler roll 2 rotatably supported by two arms 3 fixed to and extending from a shaft 4 rotatably supported by bearings 7. On one end, the shaft 4 carries a position indicator which is shown as comprising a potentiometer 5 comprising a cam disk 5A and an inductive distance measurer 5B. On the other end, the shaft 4 carries one or more counter-balancing weights 6. A gear wheel 8 fixed on the shaft 4 meshes with a rack 9 which is reciprocable back and forth by a servo motor comprising a pneumatic cylinder-piston unit 10. Air pressure for actuating the servo motor 10 is supplied to the servo motor through a valve 11.

The air pressure on the valve 11 is controlled by the control device 12 which has its input circuit connected with the position indicator 5.

For placing the feeler 2, 3 out of operation, while the apparatus is being put into operation for treatment of the produced strand, there is provided a further servo motor 13 which is likewise formed of a pneumatic piston-cylinder unit. This servo motor 13 works with its piston rod on a lever 14 which is rotatable on the shaft 4 by means of a bearing 15. This lever 14 is, through suitable swinging, engagable with a bolt 16 which is fast on the gear wheel 8 or another wheel fast on the shaft 4.

The apparatus operates in the following manner:

While the apparatus is being put into operation, the feeler roll 2 is to be brought into a position which facilitates a manual or automatic threading of the profile strand in the particular most over one another or under one another transport passages. For this purpose the servo motor 13 is supplied with pressure so that it swings the lever 14 out of its rest position, until it engages the bolt 16 and moves the bolt 16 to turn the gear wheel 8. Through this turning of the gear wheel 8, the shaft 4 with its arm 3 is rotated so that the feeler roll 2 is brought to a position which provides for the automatic or manual threading of the profile strand to be produced and treated. When the profile strand is threaded, so that the apparatus can change over into its normal operation, the compressed air is let out of servo motor 13 and thereby the lever 14 is returned to its original position. During the entire operation of the apparatus, the servo motor 13 is not supplied with pressure; its piston can thus move freely in its cylinders.

Figure 2:
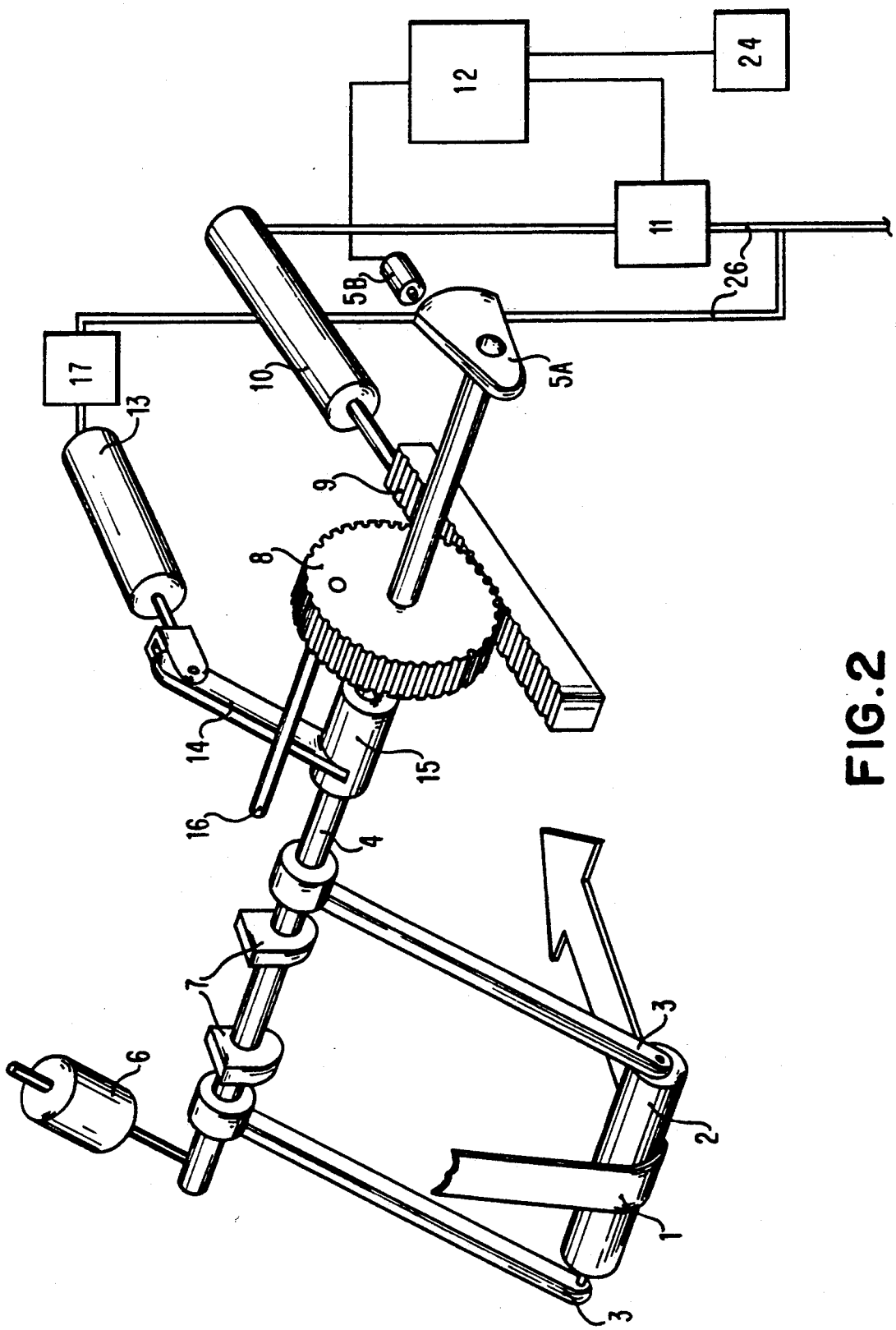
FIG. 2 is a partial schematic illustration in which the servo motor 13 is actuated by manual control.

FIG. 2 illustrates operation of the servo motor 13 by manual control. For this purpose, a manually operable value 17 is provided in the line 26 from a compressed air supply to the cylinder of the servo motor 13. When the equipment is to be put in operation, the valve 17 is operated by hand to supply compressed air to the servo motor 13. The compressed air flows into the cylinder of the servo motor 13, thereby swinging the lever 14 into engagement with the bolt 16 on gear wheel 8 and thus rotating the gear wheel and the shaft 4 on which it is fixed. Through this rotation of the shaft 4, the feeler roll 2 is swung to a position which facilitates the threading of the profile strand to be produced. After the profile strand has been threaded, the valve 17 is manually operated to disconnect the servo motor from the compressed air supply and simultaneously release the air pressure from the cylinder of servo motor 13. The lever 14 thereupon moves back to its original position and leaves the bolt 16 free, so that the control device 12 can work as a regulator of the feeler roll and can control, by the magnetic valve 11, the supply of compressed air to the cylinder of the servo motor 10. The control device 12 has a connection with the control device of the entire equipment.

Figure 3:
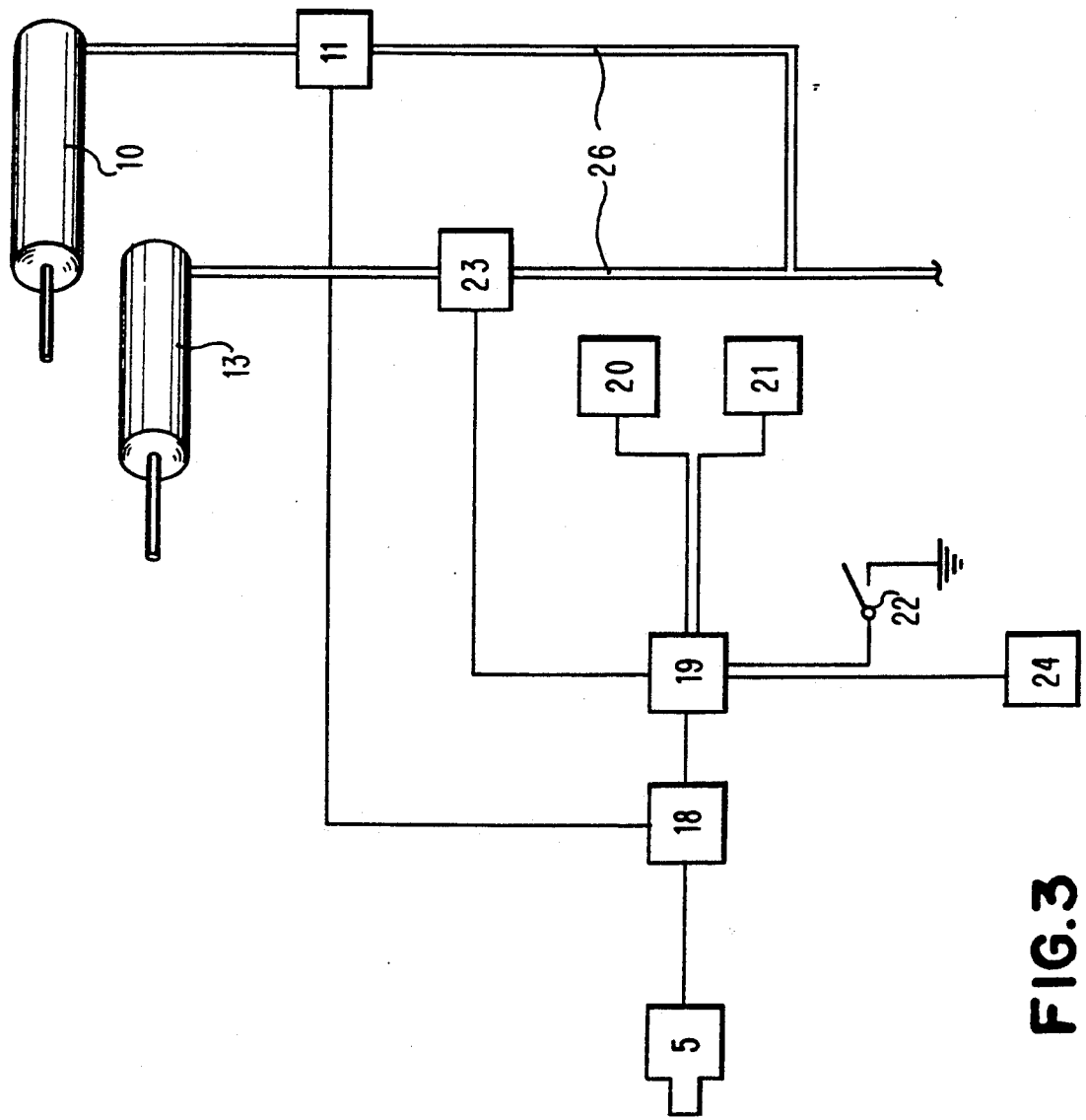
FIG. 3 is a partial schematic illustration of the apparatus in which the servo motor 13 is actuated automatically.

FIG. 3 illustrates operation of the servo motor 13 automatically. Signals from the position indicator 5 are transmitted, as a first value, to a comparator 18. From the switching circuit 19 with a program selector, the comparator 18 receives a desired value. On the input of the switching circuit 19 are connected the starting program memory 20 and the working program memory 21. A switch 22 serves for switching in the program selector 19 and thereby also for the action of the installation, for a further output of the switching circuit 19 is connected with the input of the machine control 24. The output of tho comparator 18 is connected with the input of the magnetic valve 11, which is arranged in the compressed air line 26 leading to the working cylinder 10. The working cylinder 10 and the magnetic valve 11 work in the normal operation of the machine. For the starting-up process in the beginning of operation, compressed air flow from the compressed air line 26 is controlled by a magnetic valve 23 which is connected with the switching circuit 19. In the beginning of operation, a signal from the starting program memory 20 and through the switching circuit 19 actuates the magnetic valve 23 to supply air pressure to the servo motor 13, whereby the lever 14 is swung into engagement with the bolt 16 on the gear wheel 8 to rotate the shaft 4 and thereby move the feeler roll to a position for threading the installation. During the starting-up program, the switch 11 is out of action.

There is also the possibility that the action of the switching circuit 19 with the program selector is controlled from the machine control 24 and not from the switch 22.

In normal operation, the piston of cylinder 13 is drawn back. The servo motor 10 is supplied with compressed air and it shifts the rack 9 to such position, that the gear wheel 8 turns the shaft 4 for a proper position of the feeler roll 2 in accordance with a program. The effective air pressure in the servo motor 10 thereby serves merely for an unloading of the feeler device 2, 3, the here occurring forces emanating from the servo motor 10 are not so large that they exert an essential influence on the position of the feeler roll determined by the partial wrapping around of the feeler roll 2 by the material strand 1. This engagement of the feeler roll 2 on the material strand 1—it is so light, that a stretching of the material strand cannot take place determines the angular position of the shaft 4 and thereby the angular position of the cam 5A, the outer surface of which is sensed by the inductive transmitter 5B. The pick-up signal produced in the inductive transmitter is fed to the input of the control device 12, which determines the corresponding transport velocity of the material strand 1. Simultaneously, however, in a special control circuit, this pulse varies an input value for adjustment of the valve 11.

The manner in which the control circuit 12 operates is as follows. The signal transmitted by the position indicator 5B is compared by the comparator 18 with a desired value from the machine control 24. The difference value determined by the comparator 18 is amplified by an amplifier 27 and fed to the valve 11 and thus converted into a corresponding pneumatic pressure, which becomes operative in the cylinder of the pneumatic cylinder-piston unit 10. The force with which the servo motor 10 activates the rack 9 is thereby adjusted and the force with which the feeler roll 2 is applied to the running strand-form product is controlled. The valve 11 has an outlet 28 in order to discharge surplus air when the rack 9 and the servo motor 10 are pressed back by the servo motor 13, so that no pressure build-up occurs in the servo motor 10.

In the pressure line 26 leading to the cylinder 13 there is a magnetic valve 23 which is actuated by the machine control 24 and connects the cylinder 13 either with the compressed air source or through the outlet 28 with the atmosphere.

The particular advantages of the invention are:

The tractive force which the feeler roll 2 exerts on the material strand 1, can be recalled from production specifications of the operating parameters stored in a microcomputer and applied by the fine control valve 11, without any mechanical adjustment or alteration of the feeler system 2, 3.

The force applied by the feeler system 2, 3, which acts on the product, can be held constant over the entire range of travel and is thus not, as with pure weight loading, variable depending on position.

The mechanical nominal position (angular position) of the feeler system 2, 3 can be selected as desired, without mechanical adjustment, as the system is independent of the mechanical work point.

I claim:

1. Apparatus for controlling equipment for treating rubbery strand-form product produced by extrusion,
   said equipment comprising at least one variable speed conveyor for conveying said products,
   said apparatus being disposed adjacent said conveyor and comprising,
   a rotatable shaft,
   feeler means for sensing tension in a strand-form product conveyed by said conveyor, said feeler means comprising a feeler roll carried by an arm on said shaft and engageable with said strand-form product,
   means for sensing the angular position of said shaft and producing a position-indicating signal,
   means receiving said position-indicating signal from said sensing means and regulating the speed of said conveyor responsive to said position-indicating signal,
   means for applying to said feeler means a variable, position-independent and weight-independent load, and means responsive to said position-indicating signal for varying said load.

2. Apparatus according to claim 1, in which said means for applying said load to said feeler means comprises a rotary device secured to said shaft.

3. Apparatus according to claim 1, in which said means for applying said load to said feeler means comprises a servo motor for applying a force for rotating said shaft of said feeler means.

4. Apparatus according to claim 3, in which said servo-motor comprises a pneumatic cylinder and piston unit.

5. Apparatus according to claim 4, in which a rack connected with a piston rod of said cylinder and piston unit engages a gear wheel fixed on said shaft.

6. Apparatus according to claim 1, in which the weight of said feeler roll and arm are counterbalanced by a weight on an arm fixed to said shaft.

7. Apparatus according to claim 1, further comprising means for displacing said feeler means during the threading of said strand-form product in said equipment.

8. Apparatus according to claim 4 further comprising a second pneumatic cylinder and piston unit and means actuated by said second cylinder and piston unit for displacing said feeler means during threading of said strand-form product in said equipment.

9. Apparatus for controlling equipment for treating rubbery strand-form product produced by extrusion;
   said equipment comprising at least one variable speed conveyor for conveying said products,
   said apparatus being disposed adjacent said conveyor of said equipment and comprising,
   a rotatable shaft, a feeler roll carried by an arm on said shaft and engageable with said strand-form products,
   means for sensing the angular position of said shaft and producing a position-indicating signal,
   a gear wheel fixed on said shaft;
   means for rotating said shaft comprising a rack engaging said gear wheel and a pneumatic servo motor for moving said rack longitudinally and thereby rotating said shaft to vary the position of said feeler roll, means for supplying air pressure to said servo motor, and control means responsive to said position-indicating signal for controlling the speed of said conveyor of said equipment and also controlling said air pressure supply means to regulate the supply of air pressure to said servo motor.

10. Apparatus according to claim 9, further comprising means for rotating said shaft to move said feeler roller to a position permitting threading-up of said equipment when starting operation of said equipment.

11. Apparatus according to claim 10, in which said means for rotating said shaft when starting operation of said equipment comprises a second pneumatic servo motor.

12. Apparatus according to claim 11, in which said second servo motor actuates an arm which is rotatable on said shaft and is engageable, when actuated by said second servo motor, with an abutment which is fixed with reference to said shaft.

13. Apparatus according to claim 1, in which said means for sensing the angular position of said shaft comprises a cam disk on said shaft and an inductive distance measuring means for sensing the distance between said inductive measuring means and a cam surface of said cam disk.

14. Apparatus according to claim 9, in which said means for sensing the angular position of said shaft comprises a cam disk on said shaft and an inductive measuring means for sensing the distance between said inductive measuring means and a cam surface of said cam disk.

15. Apparatus for controlling equipment for treating rubbery strand-form products produced by extrusion, said equipment comprising at least one variable speed conveyor for conveying said products, said apparatus being disposed adjacent said conveyor and comprising, a rotatable shaft, a feeler roll carried by an arm on said shaft and engageable with said strand-form products, a gear wheel fixed on said shaft;

a pneumatic cylinder-piston unit having a piston rod and a rack fixed to said piston rod engaging said gear wheel on said shaft, means for supplying a variable pressure to said pneumatic cylinder-piston-unit, control means for controlling the speed of said conveyor and the pressure of air supplied to said pneumatic cylinder-piston unit by said air supply means and means for sensing the angular position of said shaft and transmitting a position-indicating signal to said control means said control means being responsive to said position-indicating signal.

16. Apparatus according to claim 15, in which said means for sensing the angular position of said shaft comprises a cam disk on said shaft and means for sensing the distance between a fixed point and a cam surface of said cam disk.

* * * * *